US011632145B2

(12) United States Patent
Tsiaflakis et al.

(10) Patent No.: US 11,632,145 B2
(45) Date of Patent: Apr. 18, 2023

(54) METHOD AND APPARATUS FOR FULL-DUPLEX COMMUNICATION OVER WIRED TRANSMISSION MEDIA

(71) Applicant: Alcatel Lucent, Nozay (FR)

(72) Inventors: Paschalis Tsiaflakis, Antwerp (BE); Jochen Maes, Antwerp (BE)

(73) Assignee: Alcatel Lucent, Nozay (FR)

( * ) Notice: Subject to any disclaimer, the term of this patent is extended or adjusted under 35 U.S.C. 154(b) by 415 days.

(21) Appl. No.: 16/471,399

(22) PCT Filed: Dec. 18, 2017

(86) PCT No.: PCT/EP2017/083198
§ 371 (c)(1),
(2) Date: Jun. 19, 2019

(87) PCT Pub. No.: WO2018/114737
PCT Pub. Date: Jun. 28, 2018

(65) Prior Publication Data
US 2021/0135707 A1    May 6, 2021

(30) Foreign Application Priority Data
Dec. 20, 2016   (EP) ..................................... 16306744

(51) Int. Cl.
*H04B 3/32* (2006.01)
*H04L 5/14* (2006.01)
*H04B 3/487* (2015.01)

(52) U.S. Cl.
CPC ............... *H04B 3/32* (2013.01); *H04B 3/487* (2015.01); *H04L 5/14* (2013.01)

(58) Field of Classification Search
CPC ........... H04B 3/32; H04B 3/487; H04L 25/03; H04L 5/0062; H04L 5/0087; H04L 5/0096; H04L 5/14
See application file for complete search history.

(56) References Cited

U.S. PATENT DOCUMENTS

| 2004/0136329 | A1* | 7/2004 | Duvaut | .................. H04Q 11/04 370/252 |
| 2009/0185606 | A1* | 7/2009 | Li | ....................... H04L 12/2856 375/222 |

(Continued)

FOREIGN PATENT DOCUMENTS

| CN | 106233635 A | 12/2016 |
| EP | 1611767 B1 | 1/2006 |

(Continued)

OTHER PUBLICATIONS

Tsiaflakis, Paschalis, et al., "Real-Time Dynamic Spectrum Management for Multi-User Multi-Carrier Communication Systems" IEEE Transactions on Communications 62.3 (2014): 1124-1137.

(Continued)

*Primary Examiner* — Derrick W Ferris
*Assistant Examiner* — M Mostazir Rahman
(74) *Attorney, Agent, or Firm* — Mendelsohn Dunleavy, P.C.; Steve Mendelsohn

(57) ABSTRACT

The present invention relates to a communication controller (131; 132) and method for controlling communications between an access node (101; 102) and a plurality of remote communication units (211; 212) coupled to the access node via at least one wired transmission medium (20; 40). At least one communication unit (111, 211; 112, 212) of the access node and of the plurality of remote communication units is configured to operate in full-duplex mode according to a first full-duplex communication profile (OP1) when using a first subset of transmission resources (TSSET1; TONESET1) selected from a whole set of transmission resources available for communication over the at least one transmission medium, and according to a second full-duplex communication profile (OP2) when using a second non-overlapping subset of transmission resources (TSSET2; TONESET2) selected from the whole set of transmission resources. The (Continued)

first full-duplex communication profile includes first downstream and upstream transmit power profiles (PSDDS1, PSDUS1) to achieve first aggregate downstream and upstream data rates (DSMAX1, USMIN1; DSMAX2, USMIN2) over the at least one transmission medium, and the second full-duplex communication profile includes second downstream and upstream transmit power profiles (PSDDS2, PSDUS2) to achieve second aggregate downstream and upstream data rates (USMAX1, DSMIN1; USMAX2, DSMIN2) over the at least one transmission medium distinct from the respective first aggregate downstream and upstream data rates. The present invention also relates to a so-configured full-duplex communication unit.

19 Claims, 5 Drawing Sheets

(56) References Cited

U.S. PATENT DOCUMENTS

| | | | |
|---|---|---|---|
| 2012/0219085 A1* | 8/2012 | Long | H04M 11/062 375/295 |
| 2015/0195005 A1* | 7/2015 | De Lind Van Wijngaarden | H04M 3/302 370/201 |
| 2015/0215059 A1* | 7/2015 | Kerpez | H04M 11/062 379/406.01 |
| 2016/0036491 A1* | 2/2016 | Sorbara | H04L 27/26 370/294 |
| 2016/0212036 A1* | 7/2016 | Oksman | H04L 43/16 |
| 2019/0007303 A1* | 1/2019 | Wackerly | H04L 45/64 |

FOREIGN PATENT DOCUMENTS

| | | |
|---|---|---|
| EP | 2940934 A1 | 11/2015 |
| EP | 2938095 B1 | 3/2017 |

OTHER PUBLICATIONS

Moraes, Rodrigo B., et al. "General framework and algorithm for data rate maximization in DSL networks." IEEE Transactions on Communications 62.5 (2014): 1691-1703.
International Search Report and Written Opinion for International Application No. PCT/EP2017/083198; dated Feb. 27, 2018.
International Preliminary Report on Patentability for International Application No. PCT/EP2017/083198; dated Jun. 25, 2019.
Communication pursuant to Article 94(3) EPC for corresponding European application No. 16306744.0; dated Oct. 12, 2020 (7 pages).
First Office Action for corresponding Chinese application No. 201780078362.4; dated May 18, 2021 (21 pages) Machine Translation.
Second Office Action for corresponding Chinese application No. 201780078362.4; dated Dec. 7, 2021 (9 pages) Machine Translation.

* cited by examiner

METHOD AND APPARATUS FOR FULL-DUPLEX COMMUNICATION OVER WIRED TRANSMISSION MEDIA

TECHNICAL FIELD OF THE INVENTION

The present invention relates to full-duplex communication over wired transmission media.

TECHNICAL BACKGROUND OF THE INVENTION

Discrete Multi-Tone (DMT) communication paradigm combined with full-duplex transmission (all carriers are simultaneously used for both directions of communication) has proven to be particularly successful for achieving record-breaking transmission rates over copper medium, such as Unshielded Twisted Pairs (UTP) or TV broadcast coaxial cables.

Full-duplex transmission can theoretically double the aggregate data rate compared to Time Division Duplexing (TDD), such as in use for G.fast, or Frequency Division Duplexing (FDD), such as in use for VDSL2. However, full-duplex transmission is also very challenging as new communication impairments arise that need to be carefully dealt with.

For instance, one can observe severe Near-End crosstalk (NEXT) from upstream transmission of a particular user into downstream reception of another user. This NEXT impairment cannot be mitigated through joint signal coordination (a.k.a. vectoring). As a result, downstream performance may be severely degraded (up to 90% of downstream data rate loss).

SUMMARY OF THE INVENTION

It is an object of the present invention to provide an improved communication scheme for full-duplex transmission.

In accordance with a first aspect of the invention, a communication controller for controlling communications between an access node and a plurality of remote communication units coupled to the access node via at least one wired transmission medium is adapted to configure at least one communication unit of the access node and of the plurality of remote communication units to operate in full-duplex mode according to a first full-duplex communication profile when using a first subset of transmission resources selected from a whole set of transmission resources available for communication over the at least one transmission medium, and according to a second full-duplex communication profile when using a second non-overlapping subset of transmission resources selected from the whole set of transmission resources. The first full-duplex communication profile includes first downstream and upstream transmit power profiles to achieve first aggregate downstream and upstream data rates over the at least one transmission medium, and the second full-duplex communication profile includes second downstream and upstream transmit power profiles to achieve second aggregate downstream and upstream data rates over the at least one transmission medium distinct from the respective first aggregate downstream and upstream data rates.

Such a communication controller typically forms part of an access node providing broadband communication services to subscribers, for instance a Distribution Point Unit (DPU) or a Digital Subscriber Line Access Multiplexer (DSLAM) for broadband communication over copper pairs, or a Cable Modem Termination System (CMTS) for broadband communication over coaxial cables.

The communication controller may alternatively form part of a network manager, network controller or alike for controlling the operation of the access node and of the remote communication units coupled thereto, or may run on a generic processing platform in the cloud.

In accordance with another aspect of the invention, a method for controlling communications between an access node and a plurality of remote communication units coupled to the access node via at least one wired transmission medium comprises configuring at least one communication unit of the access node and of the plurality of remote communication units to operate in full-duplex mode according to a first full-duplex communication profile when using a first subset of transmission resources selected from a whole set of transmission resources available for communication over the at least one transmission medium, and according to a second full-duplex communication profile when using a second non-overlapping subset of transmission resources selected from the whole set of transmission resources. The first full-duplex communication profile includes first downstream and upstream transmit power profiles to achieve first aggregate downstream and upstream data rates over the at least one transmission medium, and the second full-duplex communication profile includes second downstream and upstream transmit power profiles to achieve second aggregate downstream and upstream data rates over the at least one transmission medium distinct from the respective first aggregate downstream and upstream data rates.

In one embodiment of the invention, the first downstream and upstream transmit power profiles give precedence to downstream communications from the access node towards the plurality of remote communication units, and the second downstream and upstream transmit power profiles give precedence to upstream communications from the plurality of remote communication units towards the access node In one embodiment of the invention, at least one of the first and second downstream and upstream transmit power profiles are determined by means of a multi-user optimization algorithm that optimizes a sum of weighted downstream and/or upstream data rates achievable for respective end users over the at least one transmission medium.

In one embodiment of the invention, crosstalk channel measurements performed over the at least one transmission medium are input to the multi-user optimization algorithm for determination of the at least one of the first and second downstream and upstream transmit power profiles.

In a further embodiment of the invention, the first and second subsets of transmission resources are dynamically adjusted based on downstream and upstream traffic metrics, and the at least one communication unit is reconfigured with the adjusted first and second subsets of transmission resources concomitantly with each other.

In one embodiment of the invention, at least one of the first and second downstream and upstream transmit power profiles is dynamically adjusted, and the at least one communication unit is reconfigured with the at least one adjusted transmit power profile concomitantly with each other.

In one embodiment of the invention, at least one further communication unit of the access node and of the plurality of remote communication units operates according to the first downstream transmit power profile when using the first subset of transmission resources, the first subset of transmission resources being used by the at least one further communication unit for downstream communication only, and according to the second upstream transmit power profile when using the second subset of transmission resources, the second subset of transmission resources being used by the at least one further communication unit for upstream communication only.

In a further embodiment of the invention, the at least one further communication unit is reconfigured with the adjusted first and second subsets of transmission resources or with the at least one adjusted transmit power profile concomitantly with each other, and concomitantly with the at least one communication unit.

In one embodiment of the invention, the first and second subsets of transmission resources respectively comprise at least one first and second non-overlapping sets of contiguous DMT symbols identified by their respective positions within a transmission frame.

In one embodiment of the invention, the first and second subsets of transmission resources respectively comprise at least one first and second non-overlapping sets of contiguous tones within at least one frequency band.

In one embodiment of the invention, the at least one transmission medium comprises a plurality of subscriber lines coupling respective communication units of the access node to the plurality of remote communication units.

In an alternative embodiment of the invention, the at least one transmission medium comprises a shared wired transmission medium coupling a communication unit of the access node to the plurality of remote communication units.

Embodiments of a method for controlling communication according to the invention correspond with the embodiments of a communication controller according to the invention.

In accordance with still another aspect of the invention, a communication unit for full-duplex communication over a wired transmission medium is adapted to operate in full-duplex mode according to a first full-duplex communication profile when using a first subset of transmission resources selected from a whole set of transmission resources available for communication over the at least one transmission medium, and according to a second full-duplex communication profile when using a second non-overlapping subset of transmission resources selected from the whole set of transmission resources. The first full-duplex communication profile includes first downstream and upstream transmit power profiles to achieve first aggregate downstream and upstream data rates over the at least one transmission medium, and the second full-duplex communication profile includes second downstream and upstream transmit power profiles to achieve second aggregate downstream and upstream data rates over the at least one transmission medium distinct from the respective first aggregate downstream and upstream data rates.

Such a communication unit may form part of an access node supporting full-duplex broadband communication services, such as a DPU, a DSLAM or a CMTS, or may form part of a Customer Premises Equipment (CPE) supporting full-duplex broadband communication services, such as a DSL, G.fast or cable modem, a router or a bridge.

It is proposed, in a preliminary step, to determine two or more full-duplex operating points with respective downstream and upstream transmit power spectra. The first operating point is optimized to give precedence to downstream communications at the expense of upstream communications, and the second operating point is optimized to give precedence to upstream communications at the expense of downstream communications. These two operating points can be determined by means of a multi-user optimization algorithm (e.g., through transmit spectrum balancing) so as to obtain operating points as close as possible to the boundary line of the downstream-upstream sum-rate region or downstream-upstream average rate region.

In a subsequent step, during normal operation, it is further proposed to dynamically time-share and/or frequency-share between these two full-duplex operating points on a millisecond time scale based on upper layer information metrics (e.g., traffic sensors, MAC schedule).

This approach allows to achieve almost optimal performances, that is to say to approach the boundary line of the full-duplex downstream-upstream sum-rate region with far fewer computation. In addition, the invention allows for flexible trade-offs between upstream and downstream performance, which can be realized with a low-complexity practical implementation.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION OF THE INVENTION

Figure 1:
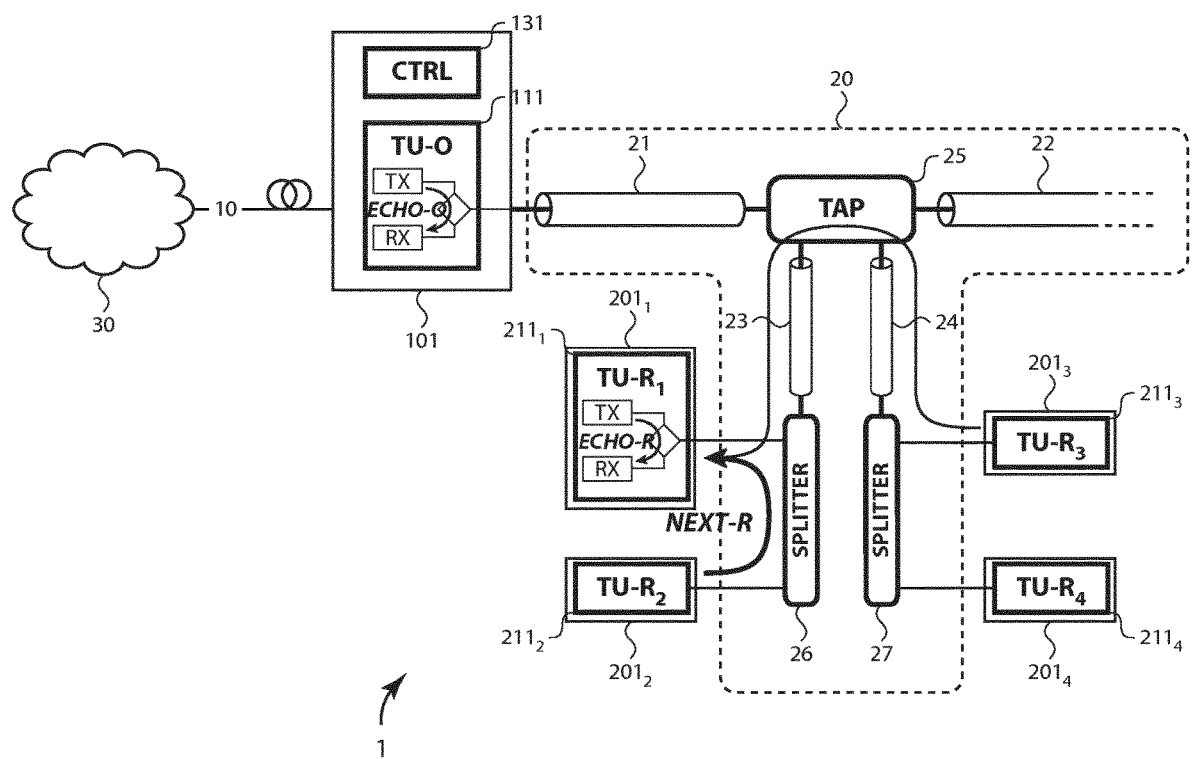
FIG. 1 represents a first wired communication system over a shared coaxial cable plant.

There is seen in FIG. 1 part of a Hybrid Fiber Coax (HFC) communication system 1 comprising a full-duplex capable CMTS 101 coupled to Cable Modems (CM) 201 via a shared medium 20, presently a coaxial cable plant, and to an operator's network 30 via one or more optical links 10.

As an illustrative example, the shared medium 20 is shown as comprising primary coaxial segments 21 and 22 and secondary coaxial segments 23 and 24 connected to each other by means of couplers. Presently, the primary coaxial segment 21 couples the CMTS 101 to a two-way tap 25, and the primary coaxial segment 22 couples the tap 25 to another two-way tap further in the plant (not shown). The tap 25 is coupled via the secondary coaxial segment 23 to a splitter 26 coupled to the CMs $201_1$ and $201_2$, and via the secondary coaxial segment 24 to a splitter 27 coupled to the CMs $201_3$ and $201_4$.

The coupling losses induced by the tap 25 and the splitters 26 and 27 depend on their exact hardware implementation, and may vary from one coupler type to another, and further from one manufacturer to another. Yet, there are some generic coupling characteristics that are noteworthy. The path loss through the tap 25 between the primary segments 21 and ranges from 1 to 3 dB. The path loss through the tap 25 between the primary segment 21 and the secondary segments 23 and 24 is higher, generally ranging from 8 to 27 dB. The tap 25 further prevents the return upstream signal over the secondary segment 23 from coupling back into the secondary segment 24, and vice-versa. This path loss is typically about 30 dB. The path loss through the splitter 26 or 27 between the secondary segments 23 and 24 and the respective CMs 200 is typically about 4 dB. The path loss between CMs connected to the same splitter is in the range of 20 to 25 dB.

The CMTS 101 includes a transceiver unit 111 (or TU-O) coupled to the shared medium 20 and operating in full-duplex mode, meaning that the same set of carriers is used simultaneously for both downstream communications (from the CMTS 101 towards the CMs 201) and upstream communications (from the CMs 201 towards the CMTS 101).

The CMs $201_1$ to $201_4$ include respective transceiver units $211_1$ to $211_4$ (or TU-$R_1$ to TU-$R_4$) coupled to the shared medium 20. The transceiver units 211 do not necessarily operate all in full-duplex mode: they may operate in full-duplex mode as per the transceiver unit 111, such as presently the transceiver unit $211_1$ in FIG. 1, or they may operate in legacy TDD or FDD mode, in which case carriers used for upstream communication from a given CM can be re-used for downstream communication towards another CM or vice-versa.

The transceiver units 111 and 211 individually comprise a transmitter (Tx) and a receiver (Rx) with respective analog and digital parts.

The transmit analog part comprises a Digital-to-Analog Converter (DAC), and a line driver for amplifying the transmit signal and for driving the coaxial cable. The receive analog part comprises a low-noise amplifier for amplifying the receive signal with as little noise as possible, and an Analog-to-Digital Converter (ADC). The analog part further comprises a hybrid (represented as a rhombus in FIG. 1) for coupling the transmitter analog output to the coaxial cable, and the coaxial cable to the receiver analog input while achieving high echo rejection ratio (in the order of 30 dB) from the transmitter output to the receiver input.

Some further analog components may be present along the transmit or receive analog path, such as impedance-matching circuitry for adapting to the characteristic impedance of the transmission medium, and/or protection circuitry for protecting against any current or voltage surge occurring over the transmission medium, and/or isolation circuitry for DC-isolating the transceiver unit from the transmission medium.

The transmit and receive digital parts are typically implemented by means of one or more Digital Signal Processors (DSP). The DSP is configured to operate downstream and upstream communication channels for conveying user traffic over the shared medium 20, and downstream and upstream control channels for conveying control traffic over the shared medium 20, such as diagnosis, management or On-Line Reconfiguration (oLR) commands and responses. Control traffic is multiplexed with user traffic.

More specifically, the DSP is for encoding and modulating user and control data into DMT symbols, and for demodulating and decoding user and control data from DMT symbols.

The following transmit steps are typically performed:
data encoding, such as data multiplexing, framing, scrambling, error correction encoding and interleaving;
signal modulation, comprising the steps of ordering the carriers according to a carrier ordering table, parsing the encoded bit stream according to the bit loadings of the ordered carriers, and mapping each chunk of bits onto an appropriate transmit constellation point (with respective carrier amplitude and phase), possibly with Trellis coding;
signal scaling;
Inverse Fast Fourier Transform (IFFT);
Cyclic Extension (CE) insertion; and possibly time-windowing.

The following receive steps are typically performed:
CE removal, and possibly time-windowing;
Fast Fourier Transform (FFT);
Frequency EQualization (FEQ);
signal demodulation and detection, comprising the steps of applying to each and every equalized frequency sample an appropriate constellation grid, the pattern of which depends on the respective carrier bit loading, detecting the expected transmit constellation point and the corresponding transmit binary sequence encoded therewith, possibly with Trellis decoding, and reordering all the detected chunks of bits according to the carrier ordering table; and
data decoding, such as data deinterleaving, error correction, de-scrambling, frame delineation and demultiplexing.

Some of these transmit or receive steps can be omitted, or some additional steps can be present, depending on the exact digital communication technology being used.

The CMTS 101 further includes a communication controller 131 for configuring the transceiver units 111 and 211 with respective communication profiles.

The communication controllers 131 is adapted to configure the transceiver units 111 and 211 with the appropriate communication parameters to use for upstream and downstream communications over the shared medium 20. The communication parameters include the respective communication bands to use, appropriate framing and error coding parameters, transmit power profile, etc, as well as traffic scheduling information for transmission coordination of the CMs 201 over the shared medium 20.

There is further depicted in FIG. 1 the major impairments affecting the communication throughput over the shared medium 20.

As a primary source of disturbance, the transmit signal of a given transceiver couples back into the receive path of the same transceiver, and impairs the receive signal if that transceiver unit operates in full-duplex mode. Presently, the upstream reception at the transceiver 111 is impaired by an echo signal ECHO-O, and the downstream reception at the transceiver $211_1$ is impaired by an echo signal ECHO-R.

As aforementioned, the hybrid removes a substantial part of the echo signal. The hybrid is typically designed to subtract the transmit voltage from the line voltage at the receiver input by means of hybrid coils or some resistive network. Unfortunately, the hybrid is unable to cope with the signal reflections arising from impedance mismatches along the cable plant and echoing back into the receiver along the receive path.

Therefore, the CMTS 101 and the CM $201_1$ accommodates an echo canceler (not shown) to mitigate the echo impairment at a further extent. The various echo contributions that are present in the receive signal are estimated, re-generated in the digital domain, converted in the analog domain by means of an additional DAC, and subtracted from the receive signal in the analog domain at the input of the ADC. Alternatively, one could use properly weighted analog delay lines to generate an analog replica of the echo signal.

As a secondary source of disturbance, the upstream signal of a given CM couples back into the downstream reception of another CM. For instance, the strong upstream signal from the CM $201_2$ and the weaker upstream signal from the CM $201_3$ impair the downstream reception at the CM $201_1$. This second impairment is depicted as NEXT-R in FIG. 1.

NEXT-R can be mitigated by assigning non-overlapping upstream and downstream transmission resources to the various CMs forming part of the same interference group. Yet, the spurious NEXT-R signal still dominates at the input of the ADC of the transceiver $211_1$, and causes a substantial decrease of the useful receive gain, meaning higher quantification noise and lower throughputs for downstream communications.

Figure 2:
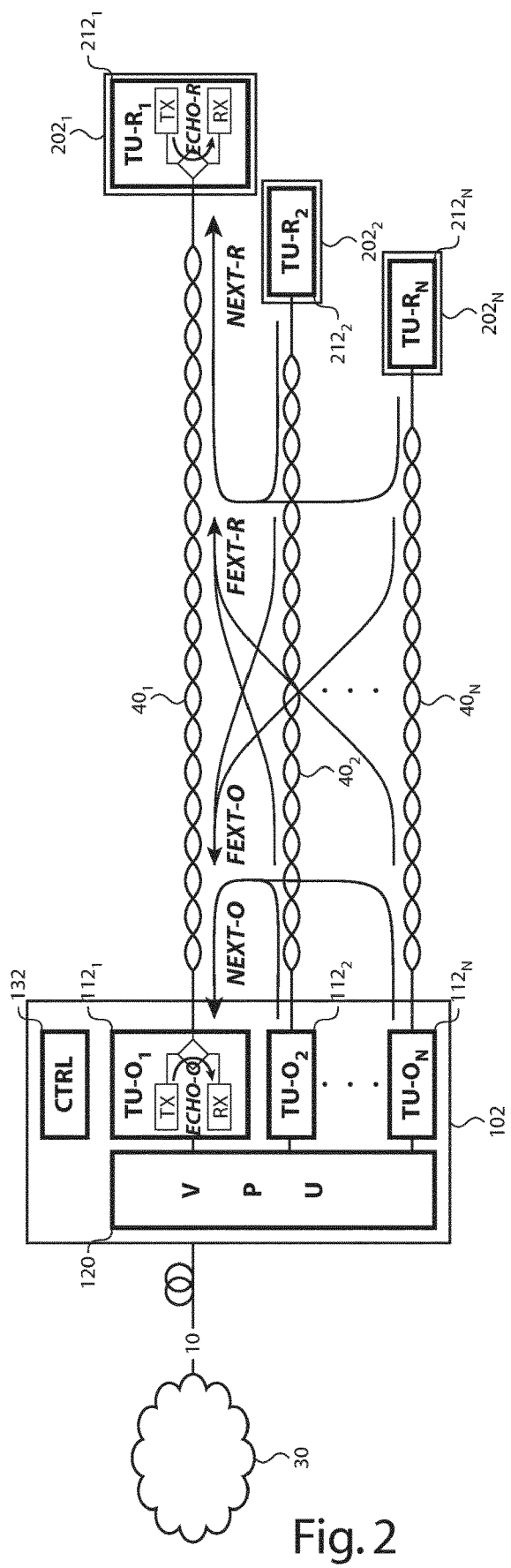
FIG. 2 represents a second wired communication system over a copper loop plant.

There is seen in FIG. 2 another communication system 2 comprising a full-duplex capable access node 102, such as a full-duplex capable DPU or DSLAM, connected to CPES 202 at subscriber premises through dedicated subscriber lines 40, such as Unshielded Twisted Pairs (UTP), and to an operator's network 30 via one or more optical links 10.

The access node 102 comprises N transceiver units $112_1$ to $112_N$ (or TU-$O_1$ to TU-$O_N$) connected through N respective subscriber lines $40_1$ to $40_N$ to N CPES $202_1$ to $202_N$, which individually comprise a transceiver unit $212_1$ to $212_N$ (or TU-$R_1$ to TU-$R_N$).

The transceiver units 112 and 212 individually comprise a transmitter (Tx) and a receiver (Rx) with an analog part and a digital part as per the transceiver units 111 and 211 of the communication system 1. The transceiver units 112 and 212 probably use different communication bands with adhoc transmit PSDS for communication over the loop plant 40, as well as a different number of carriers, a different CE length (because of the different nature of the transmission medium), different error coding schemes or different framing parameters, and their analog part is now adapted for transmission over a copper pair.

Again, the transceiver units 112 and 212 do not necessarily operate all in full-duplex mode. Depending on the hardware capability of the CPES 202, some lines may operate in full-duplex mode, such as presently the transceiver units $112_1$ and $212_1$, and some other lines may operate in legacy TDD or FDD mode.

The access node 102 further includes a communication controller 132 for configuring the transceiver units 112 and 212 with the communication parameters to use for upstream and downstream communications over the respective subscriber lines 40.

There is further depicted in FIG. 2 the major impairments affecting the communication throughput over the loop plant 40.

The subscriber lines 40 share a common binder over part or whole of their length, and thus induce Electro-Magnetic (EM) interference into each other on account of this close proximity, mostly through capacitive coupling.

As a primary source of disturbance, the transmit signal of a given transceiver couples back into the receive path of the same transceiver, and impairs the receive signal if that transceiver unit operates in full-duplex mode. Presently, the upstream reception at the transceiver $112_1$ is impaired by an echo signal ECHO-O, and the downstream reception at the transceiver $212_1$ is impaired by an echo signal ECHO-R.

As aforementioned, the access node 102 and the CPE $202_1$ further accommodates a hybrid (depicted as a rhombus) and an echo canceler (not shown) for efficient mitigation of ECHO-O and ECHO-R impairments.

As a secondary source of disturbance, the downstream transmit signal of a given transceiver unit of the access node 102 couples back into the upstream receive path of another transceiver unit of the access node 102 operating in full-duplex mode and affects its upstream reception. For instance, the downstream transmit signals of the transceiver units $112_2$ to $112_N$ couple back into the upstream receive path, and affect upstream reception, of the transceiver unit $112_1$. This impairment is depicted as NEXT-O in FIG. 2.

Similarly, the transmit upstream signal from a given CPE couples back into the downstream receive path of another CPE operating in full-duplex mode. For instance, the upstream transmit signals of the transceiver units $212_2$ to $212_N$ couple back into the downstream receive path, and affect downstream reception, of the transceiver unit $212_1$. This impairment is depicted as NEXT-R in FIG. 2.

As a third source of disturbance, the downstream transmit signal over a given line affects downstream reception over another line. For instance, the downstream transmit signals of the transceiver units $112_2$ to $112_N$ couple into the downstream receive path, and affect downstream reception, of the transceiver unit $212_1$. This third impairment is depicted as FEXT-R in FIG. 2.

Similarly, the upstream transmit signals over a given line affects upstream reception over another line. For instance, the upstream transmit signals of the transceiver units $212_2$ to $212_N$ couple into the upstream receive path, and affect upstream reception, of the transceiver unit $112_1$. This impairment is depicted as FEXT-O in FIG. 2.

The access node 102 further accommodate a vectoring Processing Unit 120 (or VPU) for jointly precoding the downstream signals to be transmitted over the subscriber lines 40 based on a precoding matrix, and for jointly postcoding the upstream signals received from the subscriber lines 40 based on a postcoding matrix. Signal precoding can mitigate FEXT-R impairments, whereas signal postcoding can mitigate both NEXT-O and FEXT-O impairments.

Yet, and as per the HFC communication system 1, no joint signal coordination is possible at subscriber side to mitigate NEXT-R as the CPEs 202 are not co-located and thus cannot exchange their respective transmit or receive samples.

Figure 3B:
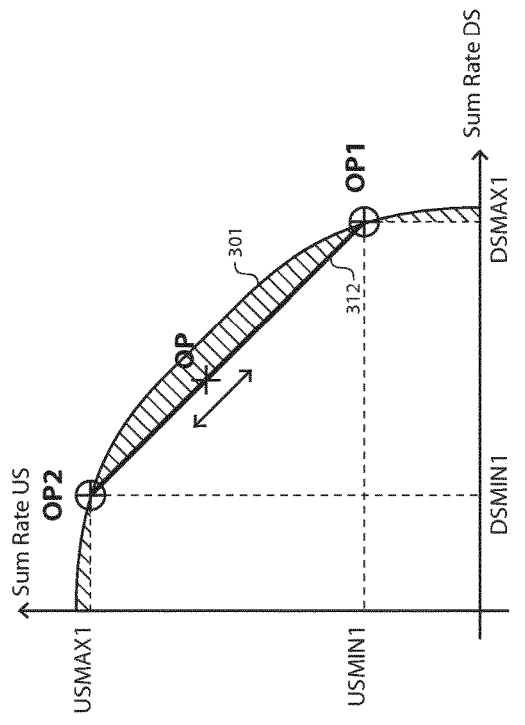
FIG. 3A to 3D represent various plots of a sum-rate region over a copper loop plant and associated operating points.
Figure 3D:
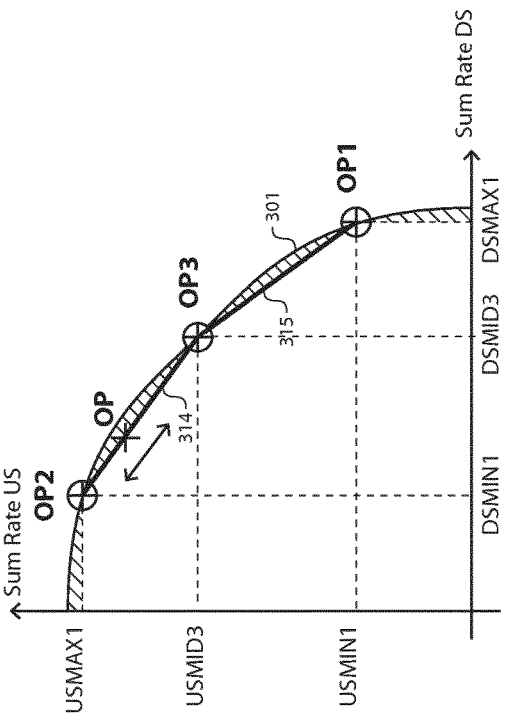
Figure 4A:
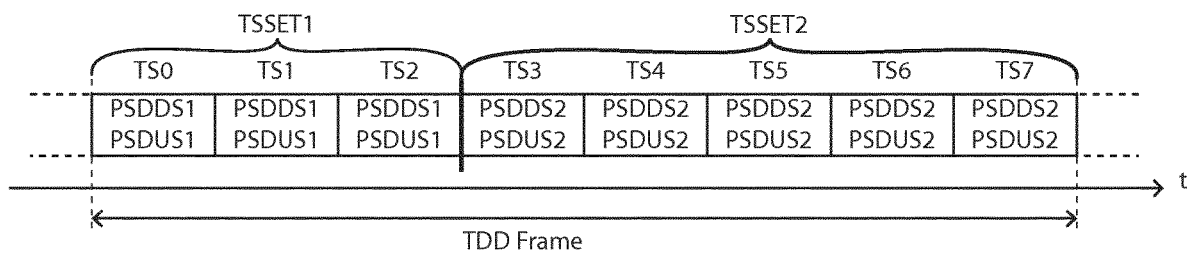
FIG. 4A to 4c represent a time-sharing of the transmission resources between two full-duplex operating points.
Figure 4B:
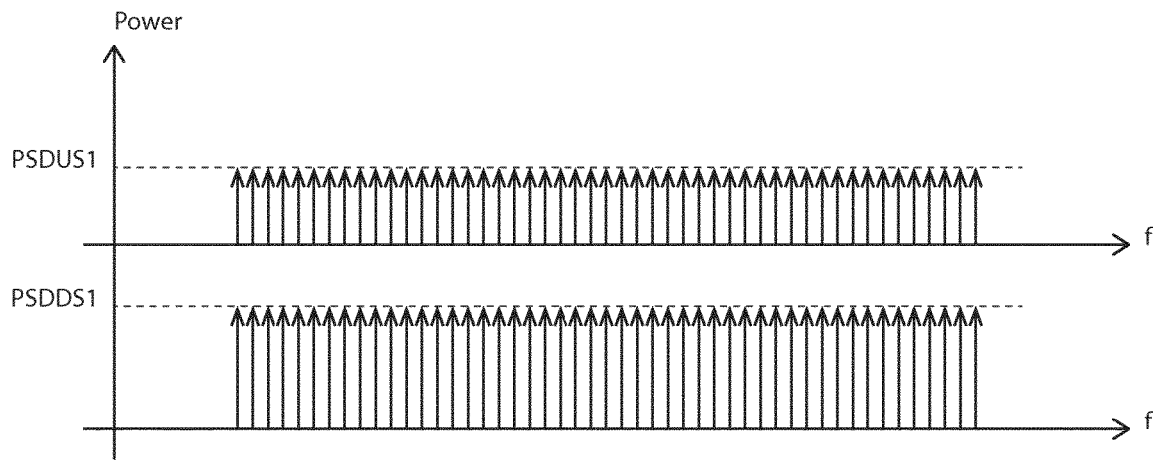
Figure 4C:
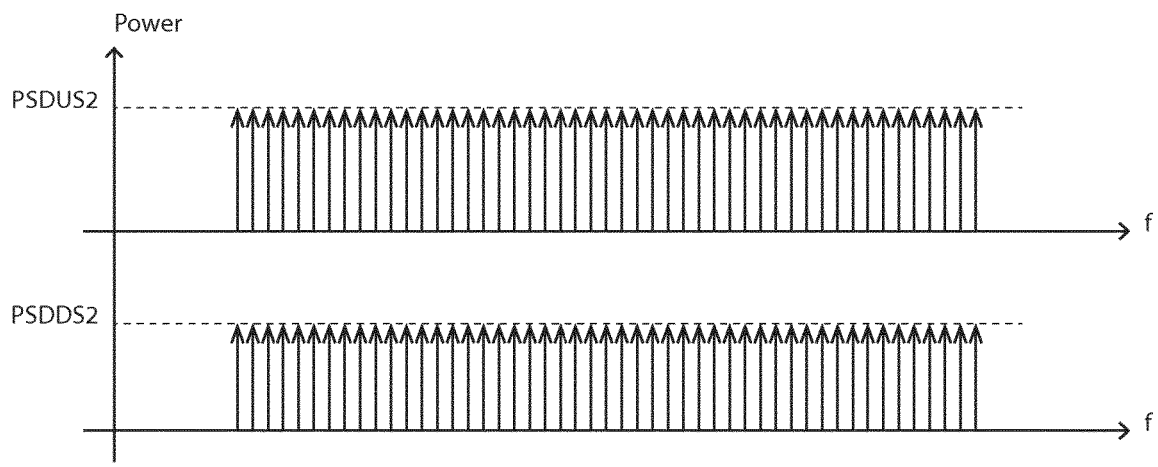
Figure 5:
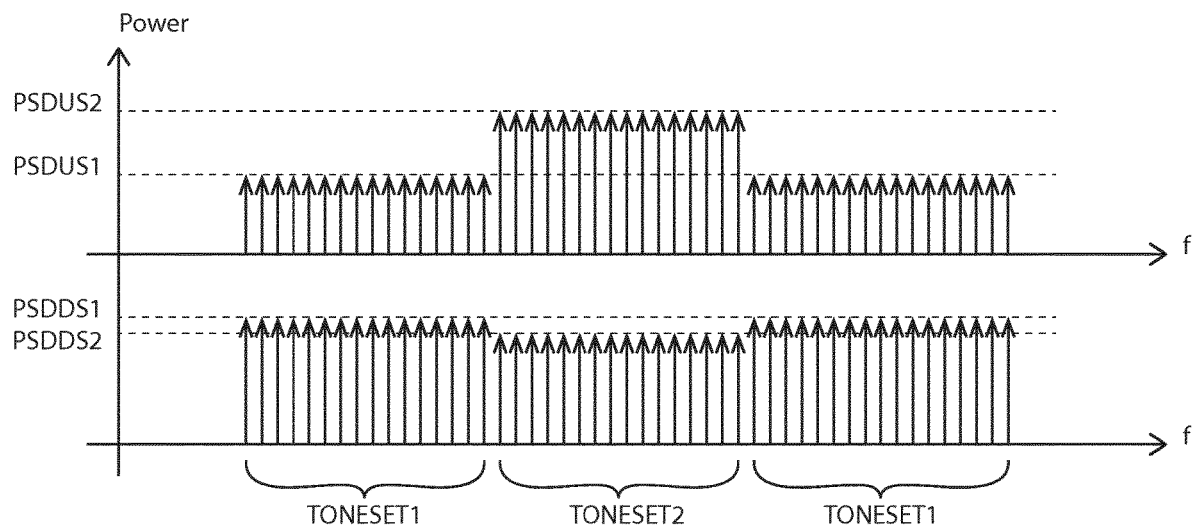
FIG. 5 represents a frequency-sharing of the transmission resources between two full-duplex operating points.

The operation and various functions of the communication controller 132 for configuring the communication system 2 as per the present invention, and more specifically for determining appropriate operating points (and corresponding transmit power profiles) and appropriate transmission resources sharing in order to improve throughputs through the loop plant 40, will now be further elaborated with regard to FIGS. 3 to 5. Some further considerations on the configuration as per the present invention of point-to-multipoint communication systems operating over shared transmission media, such as the HFC communication system 1, and related communication controller, such as the communication controller 131, will then follow.

Figure 3A:
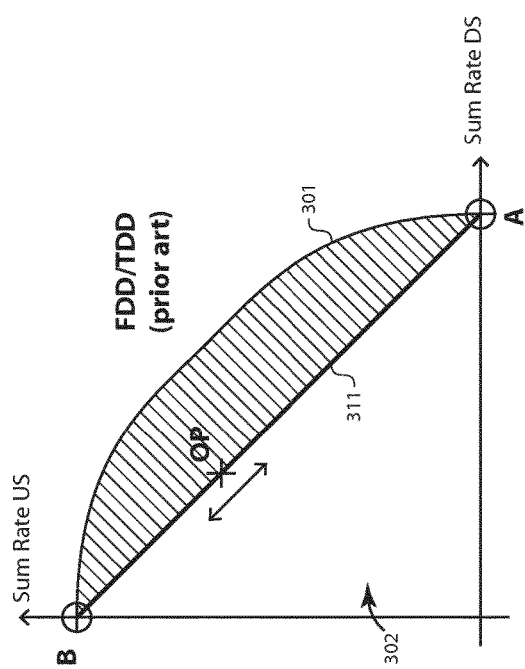

There is seen in FIG. 3A a plot of the various aggregate downstream and upstream data rates that can be achieved by the communication system 2 over the subscriber lines with various transmit power profiles. The communication system 2 can only achieve data rates within an allowable concave-shaped rate region 302 delimited by a boundary line 301. Such a shape is typical for power-limited multi-carrier communication systems suffering from NEXT-R impairments. Points on the boundary line 301 are optimal full-duplex operating points achieving a given ratio between downstream and upstream aggregate data rates. Points beyond the boundary line 301 are unrealizable. Depending on the precedence given to downstream or upstream communications, the system can be driven along the boundary line 301. Yet, the optimization problem is non-convex, and moving the system along the line 301 would involve a lot of computational resources for determining the new transmit power profiles corresponding to the newly adjusted operating point, as well as a lot of configuration overhead for re-configuring the transceiver units 112 and 212 accordingly.

The operating points A and B at the two ends of the boundary line 301 correspond to all transmission resources being used for downstream and upstream communication respectively. When using FDD or TDD for bi-directional communications, then the actual operating point OP is situated along the line 311 that connects the points A and B, its exact position depending on the frequency or time share between downstream vs upstream resources. The cross-hatched area between the lines 301 and 311 represents the data rate loss compared to the optimal full-duplex configuration.

Two full-duplex transmit power profiles are determined for dual use by the transceiver units 112 and 212 over the respective subscriber lines 40. The first transmit power profile comprises first downstream transmit power profiles $PSDDS1_{k,n}$ for use by the transceiver units $112_n$ for downstream transmission at tone k and by the transceiver units $212_n$ for downstream reception at tone k, and first upstream transmit power profiles $PSDUS1_{k,n}$ for use by the transceiver units $212_n$ for upstream transmission at tone k and by the transceiver units $112_n$ for upstream reception at tone k. Similarly, the second transmit power profile comprises second downstream transmit power profiles $PSDDS2_{k,n}$ for use by the transceiver units $112_n$ for downstream transmission at tone k and by the transceiver units $212_n$ for downstream reception at tone k, and second upstream transmit power profiles $PSDUS2_{k,n}$ for use by the transceiver units $212_n$ for upstream transmission at tone k and by the transceiver units $112_n$ for upstream reception at tone k. Omitting the user and frequency dependence, the first and second transmit power profiles will be denoted as {PSDDS1, PSDUS1} and {PSDDS2, PSDUS2} respectively.

As depicted in FIG. 3B, the first transmit power profile {PSDDS1, PSDUS1} gives precedence to downstream communications and corresponds to a first operating point OP1 achieving a given aggregate downstream data rate DSMAX1 and a given aggregate upstream data rate USMIN1, and the second transmit power profiles {PSDDS2, PSDUS2} gives precedence to upstream communications and corresponds to a second operating point OP2 achieving a given aggregate upstream data rate USMAX1 and a given aggregate downstream data rate DSMIN1.

The first and second transmit power profiles {PSDDS1, PSDUS1} and {PSDDS2, PSDUS2} are determined by means of an optimization algorithm in order to find out operating points as close as possible to the boundary line 301. Various transmit spectrum balancing algorithms have been described in the technical literature. Typically, these algorithm determines an optimal multi-user transmit power profile that maximizes a sum of weighted downstream and/or upstream data rates achievable for the end users while adhering to one or more given constraints, such as a given transmit power mask within which the transmit signal shall be confined, and/or a maximum aggregate transmit power level to conform to, and/or a minimum guaranteed user data rate to comply with. Full channel knowledge is required for running the optimization algorithm. Consequently, the optimization algorithm is fed with crosstalk channel estimates derived from crosstalk channel measurements performed over the loop plant 40, typically by means of mutually-orthogonal crosstalk probing signals such as in use for G.fast and vectored VDSL2.

Mathematically, this maximization problem reads as:

$$\{S_{k,n}^{DS}, S_{k,n}^{US}\} = \underset{S_{k,n}^{DS}, S_{k,n}^{US} \forall k,n}{\operatorname{argmax}} \left[ \sum_n w_n^{DS} R_n^{DS} + w_n^{US} R_n^{US} \right] \quad (1)$$

$$\text{s.t.} \sum_k S_{k,n}^{DS} \leq P_{k,n}^{DS} \text{ and } \sum_k S_{k,n}^{US} \leq P_n^{US}, \forall n,$$

wherein $S_{k,n}^{DS}$ and $S_{k,n}^{US}$ denote the downstream and upstream PSDS for user n at tone k; $R_n^{DS}$ and $R_n^{US}$ denote the downstream and upstream data rates achievable for user n across all tones; $w_n^{DS}$ and $w_n^{US}$ denotes downstream and upstream weights for user n in order to give precedence to a particular user or to a particular direction of communication; and $p_n^{DS}$ and $p_n^{US}$ denote the maximum allowed aggregate downstream and upstream transmit power levels for user n. Some further transmit power mask constraints may be included as well, such as $S_{k,n}^{DS} \leq M_{k,n}^{DS}$ and $S_{k,n}^{US} \leq M_{k,n}^{US}$, $\forall k, n, M_{k,n}^{DS}$ and $M_{k,n}^{DS}$ denoting the applicable downstream and upstream transmit power masks.

One could then determine the first transmit power profile {PSDDS1, PSDUS1} and corresponding operating point OP1 by giving more weight to downstream rates than upstream rates in eq. (1), and the second transmit power profile {PSDDS2, PSDUS2} and corresponding operating point OP2 by giving more weight to upstream rates than downstream rates in eq. (1).

Alternatively, only the upstream transmit power profile can be optimized while using some default transmit power profile for downstream transmission, in which case the optimization problem reads as:

$$\{S_{k,n}^{US}\} = \underset{S_{k,n}^{US} \forall k,n}{\operatorname{argmax}} \left[ \sum_n w_n^{DS} R_n^{DS} + w_n^{US} R_n^{US} \right] \quad (2)$$

$$\text{s.t.} \sum_k S_{k,n}^{US} \leq P_n^{US}, \forall n.$$

Still alternatively, one could maximize the downstream data rates while guaranteeing a minimal upstream data rate for determining the first operating point OP1, and maximize the upstream data rates while guaranteeing a minimal downstream data rate for determining the second operating point OP2, in which case the optimization problem reads as:

$$\{S_{k,n}^{DS}, S_{k,n}^{US}\}^{(1)} = \underset{S_{k,n}^{DS}, S_{k,n}^{US} \forall k,n}{\operatorname{argmax}} \left[ \sum_n w_n^{DS} R_n^{DS} \right] \quad (3)$$

$$\text{s.t.} \sum_k S_{k,n}^{DS} \leq P_n^{DS} \text{ and } \sum_k S_{k,n}^{US} \leq P_n^{US} \text{ and } R_n^{US} \geq R_{MIN}^{US}, \forall n, \text{ and}$$

$$\{S_{k,n}^{DS}, S_{k,n}^{US}\}^{(2)} = \underset{S_{k,n}^{DS}, S_{k,n}^{US} \forall k,n}{\operatorname{argmax}} \left[ \sum_n w_n^{US} R_n^{US} \right] \quad (4)$$

$$\text{s.t.} \sum_k S_{k,n}^{DS} \leq P_n^{DS} \text{ and } \sum_k S_{k,n}^{US} \leq P_n^{US} \text{ and } R_n^{DS} \geq R_{MIN}^{DS}, \forall n$$

wherein $R_{MIN}^{DS}$ and $R_{MIN}^{US}$ denote the minimum downstream and upstream data rates to achieve for operating points OP2 and OP1.

The communication controller 132 either determines by its own the optimal transmit power profiles corresponding to the operating points OP1 and OP2 by running the appropriate optimization algorithm, or fetches the optimal transmit power profiles {PSDDS1, PSDUS1} and {PSDDS2, PSDUS2} from a network manager, network controller or alike. These two optimal transmit power profiles only need to be computed occasionally, e.g. during initialization, or when a line joins or leaves, or upon a substantial change of the channel characteristics.

In a second step, the communication controller 132 determines on a faster timescale (e.g., a few ms) the share of transmission resources, such as number of DMT symbols within a TDD frame or number of tones, to assign to the first and second transmit power profiles {PSDDS1, PSDUS1} and {PSDDS2, PSDUS2} respectively. The share is dynamically adjusted based on traffic metrics, such as amount of traffic pending in transmit queues in upper layers, MAC schedules, etc.

Time sharing is depicted in FIGS. 4A, 4B and 4C. As one can see, a first set of DMT symbols TSSET1 within a TDD frame is assigned to the first operating point OP1 and corresponding transmit power profile {PSDDS1, PSDUS1}, namely DMT symbols from position 0 to position 2, and a second set of DMT symbols TSSET2 within the TDD frame is assigned to the second operating point OP2 and corresponding transmit power profile {PSDDS2, PSDUS2}, namely DMT symbols from position 3 to position 7.

As depicted in FIGS. 4B and 4C, all carriers are simultaneously used for both upstream and downstream communications. During the time period TSSET1, the transceiver units 112 use all tones with PSDDS1 as downstream transmit power profile, and the transceiver unit 212 use all tones with PSDUS1 as upstream transmit power profile (the user and frequency dependence has been purposely omitted in FIGS. 4B and 4C). During the time period TSSET2, the transceiver units 112 transmit all tones with PSDDS2 as downstream transmit power profile, and the transceiver units 212 use all tones with PSDUS2 as upstream transmit power profile.

Frequency sharing is depicted in FIG. 5. Here, a first set of tones TONESET1 use the first transmit power profile {PSDDS1, PSDUS1}, while at the same time a second set of tones TONESET2 use the second transmit power profile {PSDDS2, PSDUS2}. The two sets of tones TONESET1 and TONESET2 include one or more blocks of contiguous tones in one or more communication bands.

With frequency sharing, the transceiver units 112 use PSDDS1 as transmit power profile for the downstream tones belonging to the set TONESET1, and transmit power profile PSDDS2 for the downstream tones belonging to the set TONESET2 (again omitting the user and frequency dependence in FIG. 5). The transceiver units 212 use transmit power profile PSDUS1 for the upstream tones belonging to the set TONESET1, and transmit power profile PSDUS2 for the upstream tones belonging to the set TONESET2.

On account of this resource sharing, and referring back to FIG. 3B, the actual operating point OP can be moved along the line 312 that connects the operating points OP1 and OP2. As one can see, one can easily decrease the downstream rates from DSMAX1 to DSMIN1 while increasing the upstream rates from USMIN1 to USMAX1, or vice-versa, in order to adapt to the actual traffic demand. The cross-hatched area is far smaller than with legacy FDD/TDD techniques, meaning higher communication throughput with low complexity hardware.

The transmission power profiles {PSDDS1, PSDUS1} and {PSDDS2, PSDUS2} and the transmission resources alloted to the first and second transmit power profiles {PSDDS1, PSDUS1} and {PSDDS2, PSDUS2} are then passed by the communication controller 132 to the transceiver units 112 and 212 for further enforcement over the subscriber lines 40.

Associated with the first and second transmit power profiles are corresponding bit loading tables, fine gain tuning coefficients (the so-called gi coefficients), FEQ coefficients, possibly specific framing and error coding parameters, etc. These communication parameters are typically determined during the initialization and training phase, and can be subsequently adjusted on the fly by means of OAR commands. The different transmit profiles, along with their assigned transmission resources and associated communication parameters, are stored in a memory area of the transceivers 112 and 212 for easy and fast retrieval.

Figure 3C:
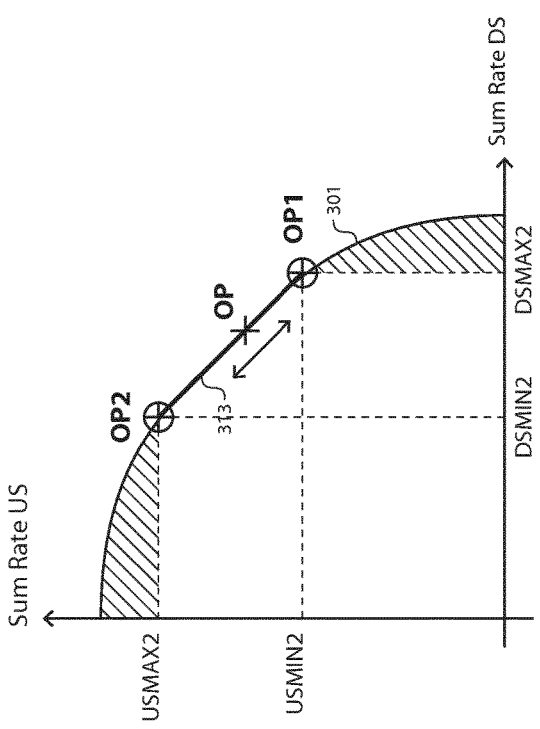

There is seen in FIGS. 3C and 3D two alternative configurations.

In FIG. 3C, the operating point OP1 achieves lower maximum downstream data rate DSMAX2 and higher minimum upstream data rate USMIN2, and the operating point OP2 achieves lower maximum upstream data rate USMAX2 and higher minimum downstream data rate DSMIN2. Yet, the operating point OP gets closer to the boundary line 301, thereby closing the gap with the optimal full-duplex configuration.

In FIG. 3D, an additional operating point OP3 has been added achieving DSMID3 and USMID3 as downstream and upstream aggregate data rates. In this configuration, the transceiver units 112 and 212 use either the dual transmit profiles {PSDDS1, PSDUS1} and {PSDDS3, PSDUS3} for achieving an aggregate downstream data rate between DSMID3 and DSMAX1 and an aggregate upstream data rate between USMIN1 and USMID3, and the dual transmit profiles {PSDDS3, PSDUS3} and {PSDDS2, PSDUS2} for achieving an aggregate upstream data rate between USMID3 and USMAX1 and an aggregate downstream data rate between DSMIN1 and DSMID3. Again, the gap with the optimal full-duplex configuration is smaller. Further operating points can be added, yet at the expense of an increased complexity and increased configuration overhead.

The operating points OP1 and OP2, as well as any further operating points such as OP3, do not need to be exactly situated on the boundary line 301. The operating points can be chosen close to the boundary line 301. Indeed, data rates starts improving when the operating points are selected above the legacy TDD/FDD line 311.

If a particular CPE does not support full-duplex communication, then the corresponding transceiver units 112 and 212 keep on operating in legacy TDD or FDD mode, yet the transmission resource sharing and associated transmit power profiles shall remain consistent throughout the subscriber lines 40 in order to conform to the optimal power configuration and achieve the improved data rates. More specifically, the transceiver units 112 and 212 operating in legacy TDD or FDD mode would use PSDDS1 as downstream transmit power profile when using the first set of transmission resources TSSET1 or TONESET1 exclusively for downstream communication (in which case upstream transmit profile PSDUS1 is irrelevant), and PSDUS2 as upstream transmit power profile when using the second set of transmission resources TSSET2 or TONESET2 exclusively for upstream communication (in which case downstream transmit profile PSDDS2 is irrelevant).

If the transmit power profiles or the share of transmission resources are adjusted by the communication controller 132, then the transceiver units operating in legacy TDD or FDD mode shall be reconfigured accordingly and concomitantly with the transceiver units operating in full-duplex modes.

The present invention is also applicable to point to multipoint transmission as per the the HFC communication system 1, and the communication controller 131 mostly acts as per the communication controller 132. Yet, there a few noticeable differences.

Let us assume that only one pair of downstream and upstream transmission can take place at a given time. For instance, we can have downstream transmission from CMTS 101 towards CM $201_1$, and at the same time upstream transmission from CM $201_3$ towards CMTS 101. This results in N(N−1) possible rate regions (excluding downstream and upstream transmission from the same pair), N denoting the number of CMs connected to the shared medium 20.

For each rate region, one can obtain a trade-off between upstream and downstream performance. Each rate region can be characterized by two or more optimal or sub-optimal operating points on the rate region that are configured by the slow control step. The choice of which downstream-upstream pair is active, and next which time or frequency sharing between the two operating points is configured, is determined by the fast control step. This allows to enable different rate region optimal trade-offs for a particular downstream-upstream pair, improving performance with respect to legacy TDD or FDD operation or operation based on interference groups.

It is to be noticed that the term 'comprising' should not be interpreted as being restricted to the means listed thereafter. Thus, the scope of the expression 'a device comprising means A and B' should not be limited to devices consisting only of components A and B. It means that with respect to the present invention, the relevant components of the device are A and B.

It is to be further noticed that the term 'coupled' should not be interpreted as being restricted to direct connections only. Thus, the scope of the expression 'a device A coupled to a device B' should not be limited to devices or systems wherein an output of device A is directly connected to an input of device B, and/or vice-versa. It means that there exists a path between an output of A and an input of B, and/or vice-versa, which may be a path including other devices or means.

The description and drawings merely illustrate the principles of the invention. It will thus be appreciated that those skilled in the art will be able to devise various arrangements that, although not explicitly described or shown herein, embody the principles of the invention. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, a processor should not be construed to refer exclusively to hardware capable of executing software, and may implicitly include, without limitation, Digital Signal Processor (DSP) hardware, network processor, Application Specific Integrated Circuit (ASIC), Field Programmable Gate Array (FPGA), etc. Other hardware, conventional and/or custom, such as Read Only Memory (Rom), Random Access Memory (RAM), and non volatile storage, may also be included.

The invention claimed is:

1. An apparatus comprising at least one processor and at least one memory including computer program code, the at least one memory and the computer program code configured to, with the at least one processor, cause the apparatus at least to perform:

configuring at least one communication unit of an access node and at least one remote communication unit coupled to said communication unit of said access node via a transmission medium to operate in full-duplex mode according to (i) a first full-duplex communication profile for a first subset of transmission resources selected from a set of transmission resources available for communication over the at least one transmission medium and (ii) a second full-duplex communication profile for a second subset of transmission resources selected from the set of transmission resources, wherein the first subset of transmission resources and the second subset of transmission resources are mutually non-overlapping, wherein the first full-duplex communication profile includes first downstream and upstream transmit power profiles to achieve first non-zero aggregate downstream and upstream data rates over the at least one transmission medium, and the second full-duplex communication profile includes second downstream and upstream transmit power profiles to achieve second non-zero aggregate downstream and upstream data rates over the at least one transmission medium distinct from the respective first non-zero aggregate downstream and upstream data rates, wherein the first and second subsets of transmission resources are (i) mutually non-overlapping subsets of symbols within a transmission frame or (ii) mutually non-overlapping subsets of tones within a frequency band, wherein, for at least one of the first and second full-duplex communication profiles, simultaneous downstream and upstream communications occur on at least one common tone, and wherein the first downstream and upstream transmit power profiles give precedence to downstream communications such that downstream communications have higher bandwidth than upstream communications, and the second downstream and upstream transmit power profiles give precedence to upstream communications such that upstream communications have higher bandwidth than downstream communications.

2. The apparatus according to claim 1, wherein the at least one memory and the computer program code are further configured to, with the at least one processor, cause the apparatus at least to further determine at least one of the first and second downstream and upstream transmit power profiles by means of a multi-user full-duplex optimization algorithm that optimizes a sum of weighted downstream and/or upstream data rates achievable for respective end users over the at least one transmission medium.

3. The apparatus according to claim 2, wherein the at least one memory and the computer program code are further configured to, with the at least one processor, cause the apparatus at least to further receive crosstalk channel measurements performed over the at least one transmission medium and to use in the multi-user full-duplex optimization algorithm for determination of the at least one of the first and second downstream and upstream transmit power profiles.

4. The apparatus according to claim 1, wherein the at least one memory and the computer program code are further configured to, with the at least one processor, cause the apparatus at least to further dynamically adjust the first and second subsets of transmission resources based on downstream and upstream traffic metrics, and to reconfigure the at least one communication unit and the at least one remote communication unit with the adjusted first and second subsets of transmission resources concomitantly with each other.

5. The apparatus according to claim 1, wherein the at least one memory and the computer program code are further configured to, with the at least one processor, cause the apparatus at least to further dynamically adjust at least one of the first and second downstream and upstream transmit power profiles, and to reconfigure the at least one communication unit and the at least one remote communication unit with the at least one adjusted transmit power profile concomitantly with each other.

6. The apparatus according to claim 1, wherein the at least one memory and the computer program code are further configured to, with the at least one processor, cause the apparatus at least to further configure at least one further communication unit of the access node and at least one further remote communication unit coupled to said at least one further communication unit of said access node to operate according to the first downstream transmit power profile when using the first subset of transmission resources, the first subset of transmission resources being used by the at least one further communication unit and by the at least one further remote communication unit for downstream communication only, and according to the second upstream transmit power profile when using the second subset of transmission resources, the second subset of transmission resources being used by the at least one further communication unit and by the at least one further remote communication unit for upstream communication only.

7. The apparatus according to claim 6, wherein the at least one memory and the computer program code are further configured to, with the at least one processor, cause the apparatus at least to further:
dynamically adjust the first and second subsets of transmission resources based on downstream and upstream traffic metrics, and to reconfigure the at least one communication unit and the at least one remote communication unit with the adjusted first and second subsets of transmission resources concomitantly with each other, and
reconfigure the at least one further communication unit and the at least one further remote communication unit with the adjusted first and second subsets of transmission resources concomitantly with each other, and concomitantly with the at least one communication unit and the at least one further remote communication unit.

8. The apparatus according to claim 6, wherein the at least one memory and the computer program code are further configured to, with the at least one processor, cause the apparatus at least to further:
dynamically adjust at least one of the first and second downstream and upstream transmit power profiles, and to reconfigure the at least one communication unit and the at least one further remote communication unit with the at least one adjusted transmit power profile concomitantly with each other, and reconfigure the at least one further communication unit and the at least one further remote communication unit with the at least one adjusted transmit power profile concomitantly with each other, and concomitantly with the at least one communication unit and the at least one further remote communication unit.

9. The apparatus according to claim 1, wherein the first and second subsets of transmission resources respectively comprise non-overlapping first and second sets of contiguous Discrete Multi-Tone DMT symbols identified by their respective positions within a transmission frame.

10. The apparatus according to claim 1, wherein the first and second subsets of transmission resources respectively comprise non-overlapping first and second sets of contiguous tones within at least one frequency band.

11. The apparatus according to claim 1, wherein the at least one transmission medium comprises a shared cable plant coupling the at least one communication unit of the access node to a plurality of remote communication units.

12. The apparatus according to claim 1, wherein the at least one transmission medium comprises a plurality of subscriber lines respectively coupling each of a plurality of communication units of the access node to a corresponding different one of the plurality of remote communication units.

13. The apparatus according to claim 1, being part of an access node providing broadband communication services over the at least one transmission medium.

14. A method for controlling communications between at least one communication unit of an access node and at least one remote communication unit coupled to the at least one communication unit via at least one transmission medium, wherein the method comprises:
configuring the at least one communication unit and the at least one remote communication unit to operate in full-duplex mode according to (i) a first full-duplex communication profile for a first subset of transmission resources selected from a set of transmission resources available for communication over the at least one transmission medium and (ii) a second full-duplex communication profile for a second subset of transmission resources selected from the set of transmission resources, wherein the first subset of transmission resources and the second subset of transmission resources are mutually non-overlapping,
wherein the first full-duplex communication profile includes first downstream and upstream transmit power profiles to achieve first non-zero aggregate downstream and upstream data rates over the at least one transmission medium, and the second full-duplex communication profile includes second downstream and upstream transmit power profiles to achieve second non-zero aggregate downstream and upstream data rates over the at least one transmission medium distinct from the respective first non-zero aggregate downstream and upstream data rates,
wherein the first and second subsets of transmission resources are (i) mutually non-overlapping subsets of symbols within a transmission frame or (ii) mutually non-overlapping subsets of tones within a frequency band,
wherein, for at least one of the first and second full-duplex communication profiles, simultaneous downstream and upstream communications occur on at least one common tone, and
wherein the first downstream and upstream transmit power profiles give precedence to downstream communications such that downstream communications have higher bandwidth than upstream communications, and the second downstream and upstream transmit power profiles give precedence to upstream communications such that upstream communications have higher bandwidth than downstream communications.

15. The method according to claim 14, further comprising a step of determining said at least one of the first and second downstream and upstream transmit power profiles by means of a multi-user full-duplex optimization algorithm that optimizes a sum of weighted downstream and/or upstream data rates achievable for respective end users over the at least one transmission medium.

16. An article of manufacture comprising a communication unit for full-duplex communication over a transmission medium, the communication unit comprising a transmitter configured to transmit signals to the transmission medium and a receiver configured to receive signals from the transmission medium, wherein the communication unit is adapted to operate in full-duplex mode according to (i) a first full-duplex communication profile for a first subset of transmission resources selected from a set of transmission resources available for communication over the transmission medium and (ii) a second full-duplex communication profile for a second subset of transmission resources selected from the set of transmission resources, wherein the first subset of transmission resources and the second subset of transmission resources are mutually non-overlapping, wherein the first full-duplex communication profile includes first downstream and upstream transmit power profiles to achieve first non-zero downstream and upstream data rates over the transmission medium, and the second full-duplex communication profile includes second downstream and upstream transmit power profiles to achieve second non-zero downstream and upstream data rates over the transmission medium distinct from the respective first non-zero downstream and upstream data rates, wherein the first and second subsets of transmission resources are (i) mutually non-overlapping subsets of symbols within a transmission frame or (ii) mutually non-overlapping subsets of tones within a frequency band, wherein, for at least one of the first and second full-duplex communication profiles, simultaneous downstream and upstream communications occur on at least one common tone, and wherein the first downstream and upstream transmit power profiles give precedence to downstream communications such that downstream communications have higher bandwidth than upstream communications, and the second downstream and upstream transmit power profiles give precedence to upstream communications such that upstream communications have higher bandwidth than downstream communications.

17. The article of claim 16, wherein the article is an access node providing full-duplex broadband communication services over the transmission medium, and comprising the communication unit.

18. The article of claim 16, wherein the article is Customer Premises Equipment (CPE) supporting full-duplex broadband communication services over the transmission medium, and comprising the communication unit.

19. The article according to claim 16, wherein the at least one of the first and second downstream and upstream transmit power profiles are determined by means of a multi-user full-duplex optimization algorithm that optimizes a sum of weighted downstream and/or upstream data rates achievable for respective end users over the at least one transmission medium.

\* \* \* \* \*